(12) United States Patent
Oprea et al.

(10) Patent No.: US 11,257,032 B2
(45) Date of Patent: Feb. 22, 2022

(54) SMART AUDIT OR INTERVENTION IN AN ORDER FULFILLMENT PROCESS

(71) Applicant: Everseen Limited, Blackpool (IE)

(72) Inventors: Bogdan Oprea, Timisoara (RO); Razvan-Dorel Cioarga, Oradea (RO); Joe Allen, Ballybunion (IE)

(73) Assignee: Everseen Limited, Blackpool (IE)

(*) Notice: Subject to any disclaimer, the term of this patent is extended or adjusted under 35 U.S.C. 154(b) by 44 days.

(21) Appl. No.: 16/779,852

(22) Filed: Feb. 3, 2020

(65) Prior Publication Data

US 2021/0241211 A1    Aug. 5, 2021

(51) Int. Cl.
*G06Q 10/08* (2012.01)
*G06Q 40/00* (2012.01)
(Continued)

(52) U.S. Cl.
CPC ..... *G06Q 10/087* (2013.01); *G06K 19/07758* (2013.01); *G06N 20/00* (2019.01); *G06Q 10/0635* (2013.01); *G06Q 10/0838* (2013.01); *G06Q 10/08355* (2013.01); *G06Q 40/12* (2013.12); *G08B 13/2417* (2013.01); *G08B 13/2462* (2013.01)

(58) Field of Classification Search
CPC ...... G06Q 10/087; G06Q 40/12; G06N 20/00; G06K 19/07758
See application file for complete search history.

(56) References Cited

U.S. PATENT DOCUMENTS 9,230,250 B1 *  1/2016  Parker ............... G06Q 30/0185
10,147,210 B1   12/2018  Desai et al.
(Continued)

FOREIGN PATENT DOCUMENTS

DE    202011004401 U1    6/2012

OTHER PUBLICATIONS

Anonymous: "Using Artificial Intelligence to Improve your CCTV System" Oct. 11, 2018 (Oct. 11, 2018), XP055783672, https://netwatchsystem.com/blog/usingartificial-intelligence-to-improve-your-cctv-system/.
(Continued)

*Primary Examiner* — Vanel Frenel
(74) *Attorney, Agent, or Firm* — Young Basile Hanlon & MacFarlane, P.C.

(57) ABSTRACT

A system for performing smart auditing of a picking sub-process of an order fulfilment process in a warehousing environment includes a set of cameras arranged to capture videos of the picking sub-process in real-time, and an Artificial Intelligence (AI) based processor communicatively coupled to the set of cameras. The AI based processor includes an input component for receiving and processing the captured videos to generate a processed video, and a processing component including an order process data analysis component for analysing the processed video to detect order process specific deviations, and a historical data analysis component for analysing the processed video based on historical behavioural data of corresponding order picker. The AI based processor further includes a triggering component for triggering a quality process correcting event for one or more pallets based on the analysis performed by the processing component.

21 Claims, 9 Drawing Sheets

(51) Int. Cl.
  *G06N 20/00* (2019.01)
  *G06K 19/077* (2006.01)
  *G06Q 10/06* (2012.01)
  *G08B 13/24* (2006.01)

(56) References Cited

U.S. PATENT DOCUMENTS

| | | | |
|---|---|---|---|
| 10,963,949 B1 * | 3/2021 | Jiang | G06Q 30/0635 |
| 2005/0237184 A1 | 10/2005 | Muirhead | |
| 2010/0026802 A1 | 2/2010 | Titus et al. | |
| 2017/0308940 A1 * | 10/2017 | Casey | G07F 7/00 |
| 2018/0043547 A1 * | 2/2018 | Hance | G06Q 10/063 |
| 2018/0194556 A1 * | 7/2018 | Lert, Jr. | G06Q 10/087 |
| 2019/0138381 A1 | 5/2019 | Akella et al. | |
| 2021/0049543 A1 * | 2/2021 | Jacobus | G06K 19/07758 |

OTHER PUBLICATIONS

Identpro GMBH: "Inventory tracking and lift truck management without scanning" Identplus: 3D Inventory Tracking, retrieved Jan. 22, 2020, https://identplus.net/en/forklift-and-inventory-tracking-system/.
Toyota: "Automated Solutions" retrieved Jan. 22, 2020, https://toyota-forklifts.eu/our-offer/product-range/automated-solutions/.

* cited by examiner

_US 11,257,032 B2_

SMART AUDIT OR INTERVENTION IN AN ORDER FULFILLMENT PROCESS

TECHNICAL FIELD

The present disclosure relates generally to picking sub-process of order fullfillment process, and more specifically to smart audits and randomized quality control process of the picking sub-process when little or no data is available on the performance of the process until the process has been completed.

BACKGROUND

In a distribution system, order fulfillment is a key process in managing the supply chain. It includes generating, filling, delivering and servicing customer orders. A typical order fulfillment process includes various sub-processes such as receiving order, picking an order, packing an order, and shipping the order. Receiving refers to the acceptance and storage of incoming inventory at a fulfillment center. When the fulfillment center receives the inventory, the items may be stored in dedicated warehousing locations, such as pallets. A pallet is a portable, rigid platform that is flat and can carry the load. In the picking sub-process, the picking team receives a packing slip with the items, quantities, and storage locations at the facility to collect the ordered products from their respective pallets. A pallet truck (also known as a pump truck or pallet jack) is a wheeled trolley designed to lift and transport pallets. The truck's tapered forks slot underneath the pallet and the pump handle can then be used to raise and lower the load. Pallet trucks are commonly seen in warehouses, stockrooms, and other environments where wooden pallets are frequently used.

Minimizing of possible human and process errors in the picking sub process within order fulfilment require random pallet audits of completed pallets. This means taking apart the entire pallet and manually counting individual items on the pallet and checking against the ordered quantities. However, this is a manual and extremely time-consuming process and the pallet must be re-built and wrapped and labelled for shipment thereafter. In an environment that handles hundreds of thousands of boxes per day, the audit may consist of sampling 1% of all pallets. This volume makes it costly and its effectiveness is reduced as sample is generally drawn from the total volumes, indiscriminately and without prioritisation according to risk factors. Further, sampling happens at predictable intervals, which enable the warehouse operators to anticipate which pallet is due next, and pay particular attention to loading it well. Also, inspection is performed by colleagues, so there is strong peer pressure to not identify non-conformance. Thus, the traditional way of performing audits is costly, inefficient and cumbersome.

Hence, in view of the above, there is a need for a method and system that provides more effective quality check, and in that quality assurance may be achieved by using Artificial Intelligence (AI) driven process shaping.

SUMMARY

In accordance with one aspect of the present disclosure, there is provided a system for performing smart auditing of a picking sub-process of an order fulfilment process in a warehousing environment, wherein the warehousing environment comprises one or more racks for storing one or more boxes on one or more pallets, and wherein each pallet is assigned a unique identification (ID) in an information database. The system may include a set of cameras arranged to capture the picking sub-process in real-time, and an Artificial Intelligence (AI) based processor communicatively coupled to the set of cameras. The AI based processor may include an input component configured to receive and process a set of video inputs from corresponding set of cameras to generate a processed video of the picking sub-process, a processing component and a triggering component. The processing component may include an order process data analysis component configured to analyze the processed video to detect one or more order process specific deviations, for example, the picking of product and quantities to a prescribed instruction or the handling of perishable goods in acordance with any special handling rules etc, and a historical data analysis component configured to analyze the processed video based on historical behavioural data of corresponding order picker. The triggering component is configured to trigger a quality process correcting event for one or more pallets based on analysis performed by the processing component.

In accordance with another aspect of the present disclosure, there is provided a method for performing smart auditing of a picking sub-process of an order fulfilment process in a warehousing environment, wherein the warehousing environment comprises one or more racks for storing one or more boxes on one or more pallets, and wherein each pallet is assigned a unique identification (ID) in an information database. The method may include capturing one or more videos of the picking sub-process in real-time. The method may further include receiving and processing the one or more captured videos to generate a processed video of the picking sub-process. The method may further include analysing the processed video to detect one or more order process specific deviations. The method may further include analysing the processed video based on historical behavioural data of corresponding order picker. The method may further include triggering a quality process correcting event for one or more pallets based on analysis.

In accordance with yet another aspect of the present disclosure, there is provided a computer programmable product for performing smart auditing of a picking sub-process of an order fulfilment process in a warehousing environment, wherein the warehousing environment comprises one or more racks for storing one or more boxes on one or more pallets, and wherein each pallet is assigned a unique identification (ID) in an information database. The computer programmable product includes a set of instructions, the set of instructions when executed by a processor causes the processor to capture one or more videos of the picking sub-process in real-time, receive and process the captured one or more videos to generate a processed video of the picking sub-process, analyze the processed video to detect one or more order process specific deviations, analyze the processed video based on historical behavioural data of corresponding order picker, and trigger a quality process correcting event for one or more pallets based on analysis performed by the processing component.

Various embodiments of the present disclosure uses multiple sensor arrays and artificial Intelligence software to understand and measure process conformance in real time and gives actionable insights where a nonconformance is detected. The present disclosure provides an improvement upon randomized quality control processes where little or no data is available on the performance of the process until the process has been completed. The present disclosure also addresses the inefficiencies of random audits, carried out after the fact, in high volume, high value, time constrained delivery processes. The quality assurance is achieved by using Artificial Intelligence (AI) driven process by facilitating targeted audit on items and/or pallets that have been identified to be of a higher risk of non-compliance. A non-compliance event may trigger specific items/pallets to be flagged and marked for directed attention.

The preferred embodiment adopts a new and surprising approach to sample auditing by using information about blind spots to contribute to determining which pick jobs to audit. This runs counter to traditional audit practice which uses observed items to trigger an audit or otherwise determine whether to sample an pick job for auditing. In so doing, the preferred embodiment effectively uses the observation of contextual unseen components and inference of presumptive events as basis for selection of pick jobs for audit sampling as opposed to traditional random sampling or audit approaches which are triggered by traditional business rules which rely on the detection/observation of specific items/events.

An intervention is an opportunity to address the calculated risk associated with the inferred presumptive events. Accordingly, the intervention allows correction of the process in real-time. Thus, it provides an opportunity for reducing the necessity of auditing of a pick journey, by allowing corrections to be implemented during the pick journey rather than waiting for the completion of the pick journey to conduct an audit and thereby detecting problems in the pick journey and/or picker.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
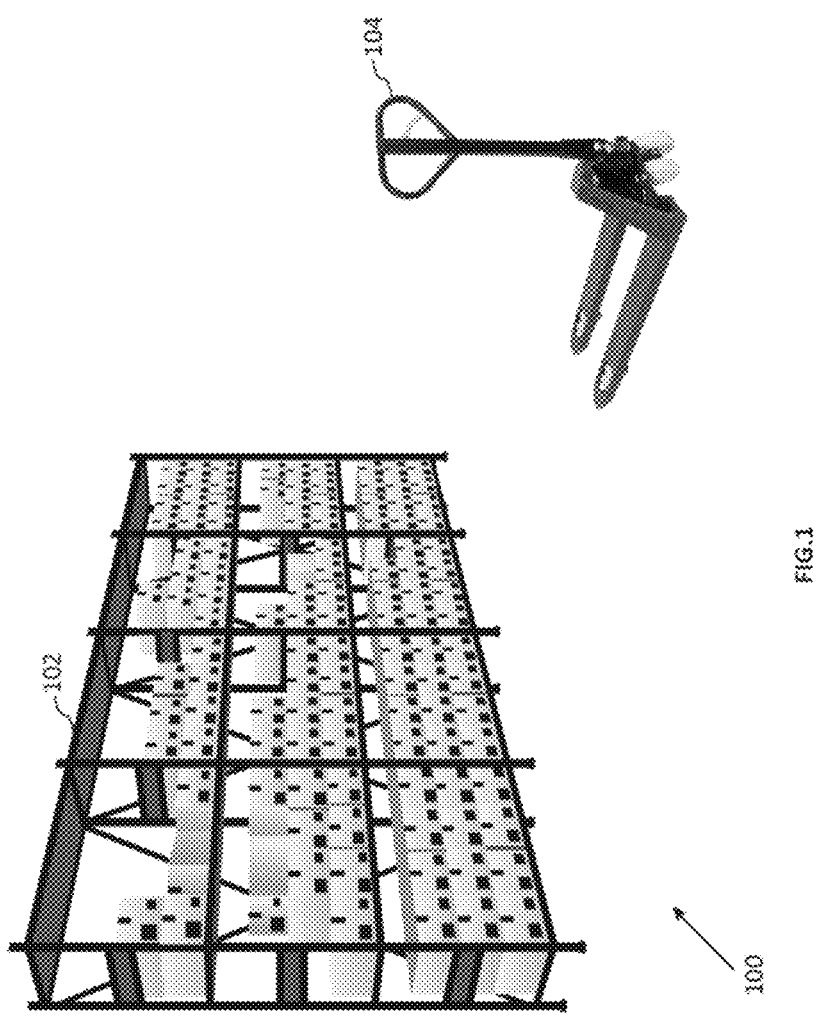
FIG. 1 illustrates an environment, wherein various embodiments of the present invention can be practiced.

FIG. 1 illustrates an environment 100, wherein various embodiments of the present invention can be practiced. The environment 100 is of a warehouse that includes a rack 102 that include multiple shelves for storing one or more boxes/containers of goods on one or more pallets, and a pallet truck 104 for lifting and transporting pallets. A pallet is a portable, rigid platform that is flat and can carry the load. In the picking sub-process, the picking team receives a packing slip with the items, quantities, and storage locations at the facility to collect the ordered products from their respective pallets using the pallet truck 104.

Figure 2:
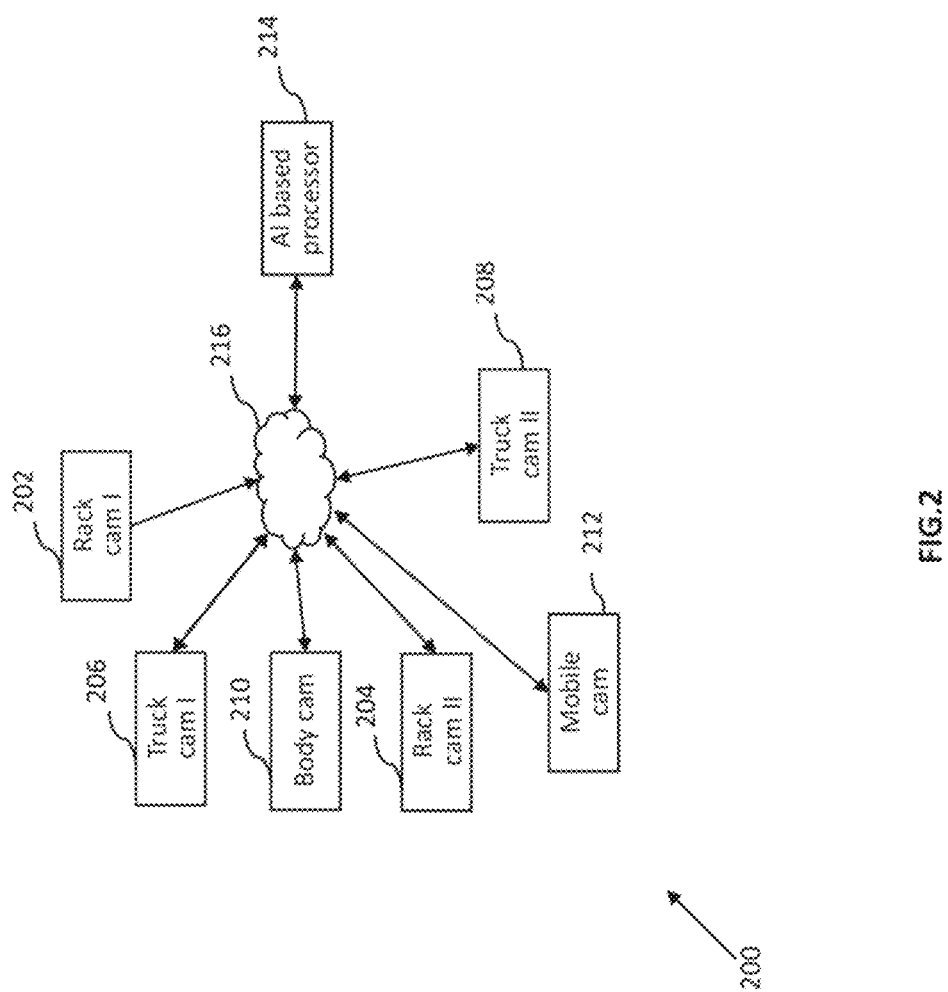
FIG. 2 illustrates a system configured to perform smart auditing of the picking sub-process in the environment of FIG. 1, in accordance with an embodiment of the present disclosure.

FIG. 2 illustrates a system 200 configured to perform smart auditing of the environment 100, in accordance with an embodiment of the present disclosure. The system 200 includes first and second rack cameras 202 and 204 configured to be positioned on the rack 102 and first and second truck cameras 206 and 208 configured to be positioned on the pallet truck 104, a body camera 210 configured to be attached to a body of an order picker, and a mobile camera 212 configured to be positioned on a mobile autonomous device (not shown), each communicatively coupled to each other and to an Artificial Intelligence (AI) processor 214 through a communication network 216. The first and second rack cameras 202 and 204, the first and second truck cameras 206 and 208, the body camera 210, and the mobile camera 212 are hereinafter referred to as a set of cameras or an environmental sensor array.

The communication network 216 may be any suitable wired network, wireless network, a combination of these or any other conventional network, without limiting the scope of the present disclosure. Some examples may include a Local Area Network (LAN), wireless LAN connection, an Internet connection, a point-to-point connection, or other network connection and combinations thereof. In one example, the network may include a mobile communication network, for example, 2G, 3G, 4G, or 5G mobile communication network. The communication network may be coupled to one or more other networks, thereby providing coupling between a greater number of devices. Such can be the case, for example, when networks are coupled together via the Internet.

In an embodiment of the present disclosure, the set of cameras are configured to capture one or more images and videos of the environment 100 in real-time and transmit the captured data to the AI based processor 214 for performing smart auditing of the picking sub-process in the environment 100. The set of cameras may include at least one of: a 360° camera, a Closed-Circuit Television (CCTV) camera, a High Definition (HD) camera, a non-HD camera, and a handheld camera.

The AI based processor 214 includes an Artificial Intelligence (AI) platform that is configured to understand and measure process conformance in the environment 100 in real time and provide actionable insights when a non-conformance is detected. The AI based processor 214 may be implemented locally at a local computing device, or at a remote processing server. In the context of the present disclosure, the AI based processor 214 includes a graphical processing unit (GPU) for processing video/image data, a memory for storing one or more instructions. Throughout the present disclosure, the term 'AI based processor' relates to a computational element that is operable to respond to and process instructions stored in a corresponding memory. Optionally, the AI based processor 214 includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. The AI based processor 214 may include an initial set of pre-defined outputs programmed and augmented with dynamic outputs created by corresponding AI software.

Figure 3A:
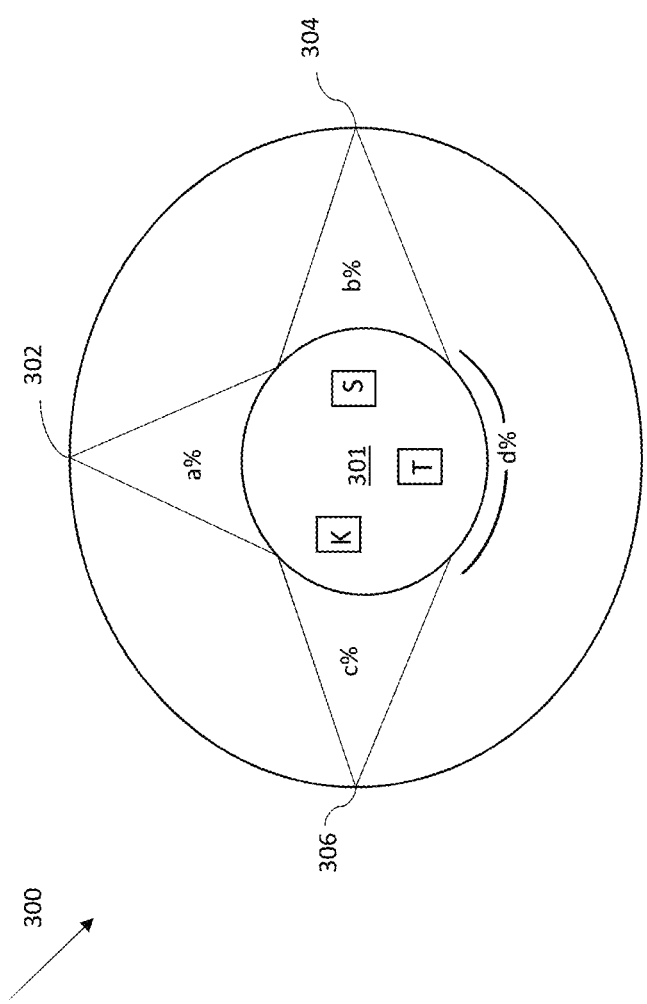
FIG. 3A illustrates an arrangement of cameras for capturing the picking sub-process of the environment, in accordance with an embodiment of the present disclosure.

FIG. 3A illustrates an arrangement 300 of the set of cameras for capturing the picking sub-process of the environment 100, in accordance with an embodiment of the present disclosure.

The arrangement 300 illustrates an item 301 within total Field of View (FoV) with particular attributes, a first camera 302 having a Field of View (FOV) covering a % of total area of the environment, a second camera 304 having a FOV covering b % of total area, and a third camera 306 having a FOV covering c % of total area. K, T and S are the items within total FoV with particular attributes. The d % of total area is unseen risk, i.e., an area not covered by the FOV of the first, second and third cameras 302, 304 and 306 and prone to blind spots, such that $$d\% = 100(a\% + b\% + c\% + \ldots n\%)$$

The positioning of the set of cameras is important as the location of each camera gives a unique perspective view which is important to the AI based processor 214 to form an overall opinion on the quality of its detailed assessment of the overall observable environment.

In an embodiment of the present disclosure, the AI based processor 214 receives video inputs from the set of cameras, weigh each video input depending on placement and environmental conditions such as vibration and lighting etc., and combine the video inputs to generate an interlaced scene of the environment 100. An interlaced scene is formed by stitching together of multiple scene views received from the set of cameras, to create a logical scene which is representative of the combination of all of the available views.

In an embodiment of the present disclosure, the views from each of the first, second and third cameras 302, 304 and 306 are fed into the AI based processor 214 and having been stitched together, the aggregated view is processed to determine if the expected behaviour is occurring and to what degree the AI based processor 214 may verify that the process is being adhered to, resulting in a derived value corresponding to a weight n % of corresponding camera.

Figure 3B:
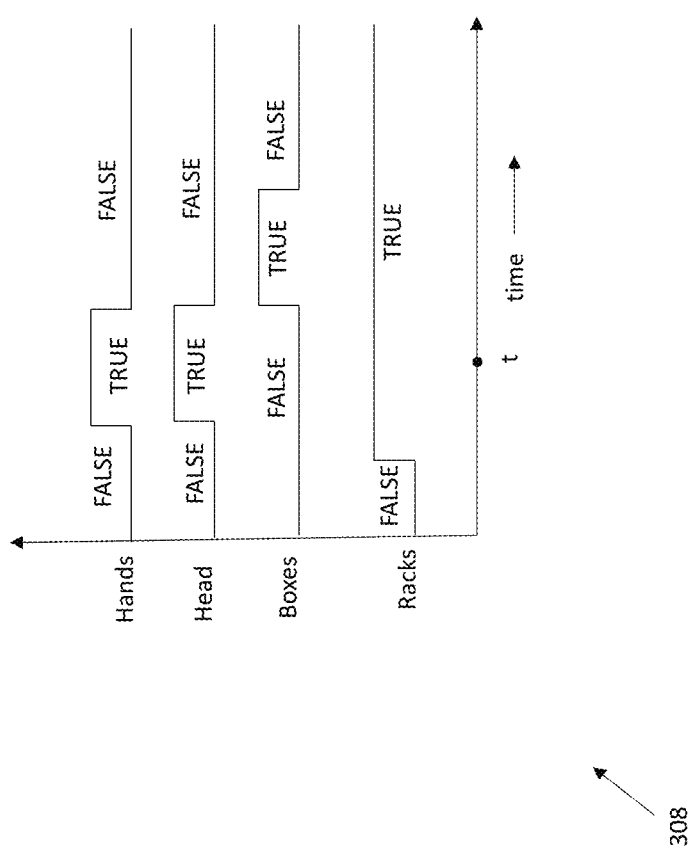
FIG. 3B is a representation illustrating inputs to the AI based processor for each input camera, in accordance with an embodiment of the present disclosure.

FIG. 3B is a representation 308 illustrating how the inputs to the AI based processor 214 add to the weighting to come up with a threshold percentage for each input camera which in turn is used by the AI based processor 214 to determine if the blind spots constitute an actionable risk to the process being carried out.

The vertical axis of the representation 308 contains attributes observed within the field of view of a single camera, and horizontal axis of the representation 308 denotes the passage of time. The attributes are items within the field of view at any given time for any expected duration. Examples of the attributes include, but are not limited to, hands, heads, boxes and racks. The attributes may be presented in a logical sequence roughly corresponding with the expected human behaviour within the field of view, while the humans are doing their work in accordance with the prescribed process.

In an embodiment of the present disclosure, a value can be assigned to discrete attributes such as hands, heads, boxes and racks. In an example, when at a time instant 't', a value '1' is assigned to a true condition, and a value '0' is assigned to a false condition, then at time instant 't', 75% is assigned to that particular single camera, in the sensor array, and an overall risk score may be ascertained.

Figure 4:
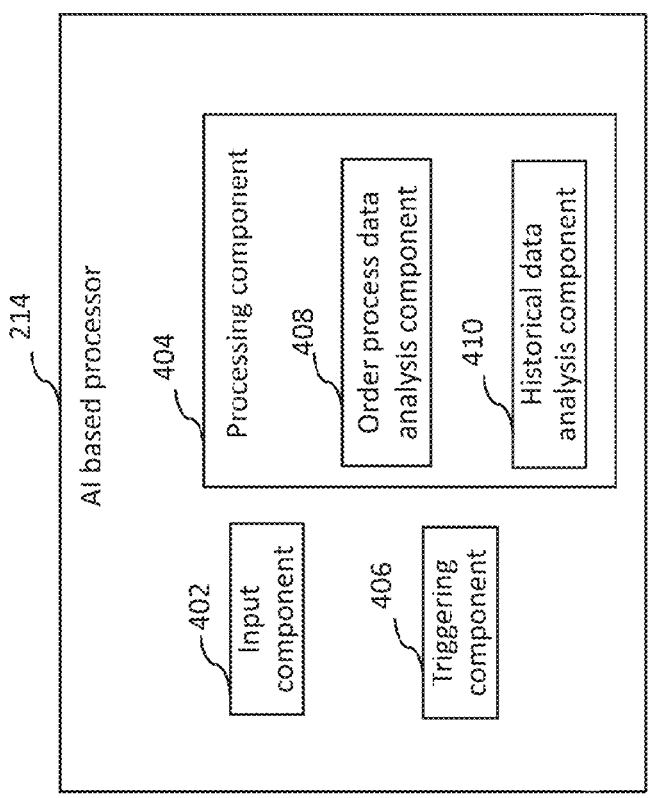
FIG. 4 illustrates the AI based processor in detail, in accordance with an embodiment of the present disclosure.

FIG. 4 illustrates the AI based processor 214 of FIG. 2 in detail, in accordance with an embodiment of the present disclosure.

The AI based processor 214 includes an input component 402, a processing component 404, and a triggering component 406. The input component 402 is configured to receive and process multiple video inputs from the set of cameras to generate a processed video of the picking sub-process in the environment 100 shown in FIG. 1. The processing component 404 includes an order process data analysis component 408 that is configured to analyze the processed video to detect order process specific deviations, and a historical data analysis component 410 configured to analyze the processed video based on historical human operative (picker) behaviour. To detect order process deviations, the processing component 404 analyzes the path followed by the picker, the time spent by the picker on different segments of the path, and the actions performed by the picker during each stage of the path. The processing component 404 then compares these with a known path corresponding to the pick instructions received through a headpiece by the picker. Based on the results of this comparison, the processing component 404 generates a risk score associated with the relevant order process. The triggering component 406 is configured to trigger a quality process deviation event audit based on the analysis performed by the processing component 404.

The order process data analysis component 408 is configured to analyze activities undertaken during a specific order picking journey/route of a picking sub-process. Thus, this analysis relates specifically to current behaviors of the order picker. The order process data analysis component 408 is configured to perform smart audit as the set of cameras inspect the pallets as they are being loaded. This gives confidence of conformance because the set of cameras are continuously supervising. In one embodiment of the present disclosure, the order process data analysis component 408 is configured to detect deviations from expected processes, in that, the set of cameras compares observed behavior of an order picker with instructions given to the order picker. The instructions may include details regarding to which location to go, which item to pick from the location, and number of items to be picked. If at any given point in an order picking route, the set of cameras detects an order picker behavior that deviates from a prescribed process/instructions, the triggering component 406 triggers a quality process correcting event which may include providing an electronic tag/ticket to a corresponding pallet, indicating that there is a potential fault in the pallet in relation to its content of the required item in question. The tag may indicate that the pallet may not be correctly built. The pallet build process allows a warehouse to build inventory, shipping, or load pallets required during the outbound process.

In an example, each pallet is assigned a unique ID number before it is built by the warehouse management system. In an embodiment of the present disclosure, the AI based processor 214 stores unique ID of each pallet, and append information to it throughout the pallet building process and retain the information in a corresponding storage device. The triggering component 406 adds an electronic tag to the unique ID of corresponding pallet in the event of any deviations. The electronic tag is a type of flag which may be an indicator of a point of concern in relation to the specific item in question in the pallet, or the pallet as whole. The electronic tag may also indicate about a definitive observed process deviation or a lack of process confirmation or an indication of lack of certainty or confidence in the execution of a specific aspect of an order.

In another embodiment of the present disclosure, the order process data analysis component 408 is configured to detect deviations of order picker's behavior from expected behaviors, in an order picking journey and enable the triggering component 406 to trigger a quality process correcting event in the event of one or more deviations. In an example, when the order-picker mistakenly passes the location to which they were instructed to go, and fails to return to the correct location, the triggering component 406 may trigger an electronic tag on corresponding pallet unique ID, indicating that an expected behavior has not occurred. The electronic tag may indicate that the order picker has missed a specific rack from the order picking journey and may also suggest that the pallet may be missing the required items from corresponding rack.

In a further example, deviation from expected behavior occurs when the order picker is instructed to go to location 5 and pick 2 boxes but the order picker goes to location 5 and only picks one box or the operator is instructed to go to location 7 and pick 3 boxes, but on arrival at location 7, no boxes are available to pick, or the operator is asked to go to location 6 and pick one box, but the operator instead mistakenly goes to location 5 and picks 1 box.

In yet another embodiment of the present disclosure, the order process data analysis component 408 is configured to use blind spots of the set of cameras to positively enhance the quality process. A blind spot is defined as an area which is not covered by the FOVs of the environmental sensor array. One or more such blind spots may exist depending on the specific configuration of the environmental sensor array.

Figure 5:
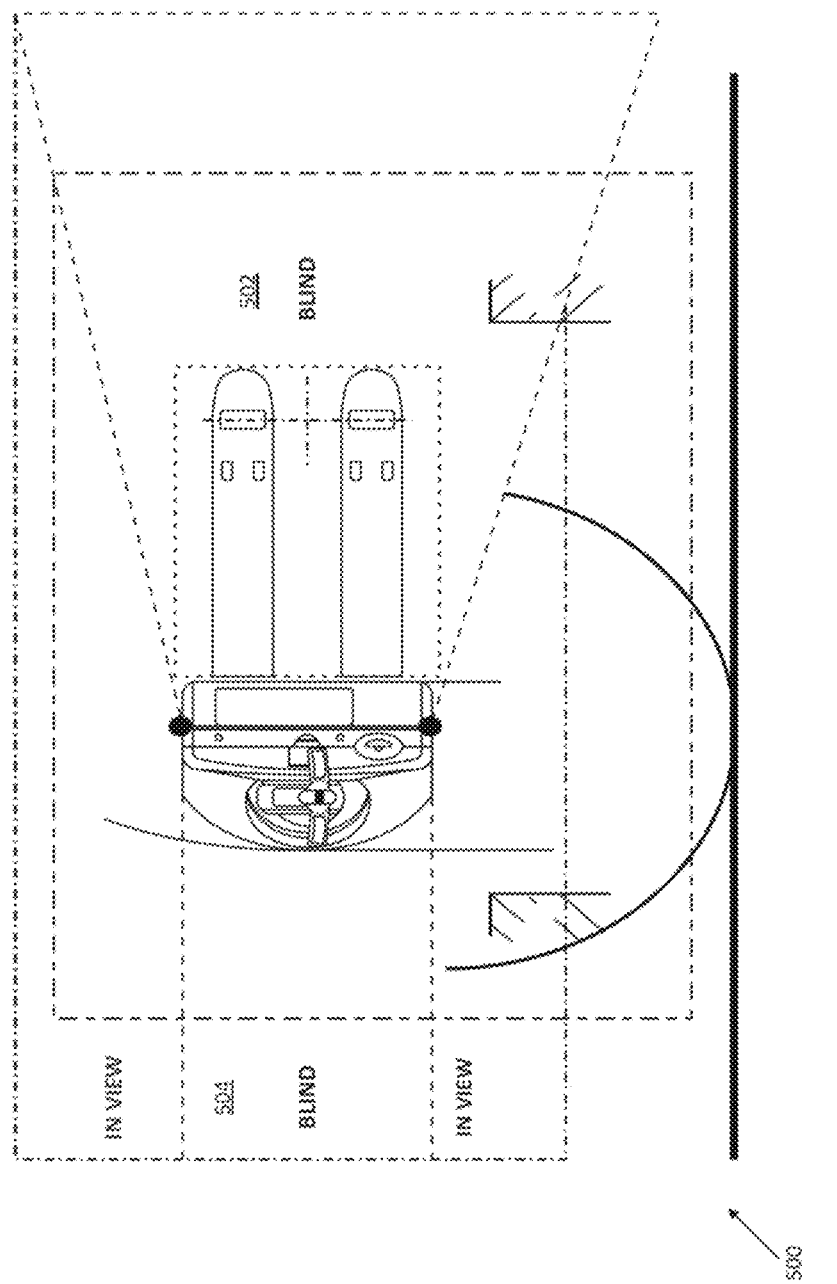
FIG. 5 illustrates first and second blind spots in the environment, in accordance with an embodiment of the present disclosure.

FIG. 5 illustrates first and second blind spots 502 and 504 in an environment 500 (similar to the environment 100), that may not be captured by two side mounted cameras. The blind spots are those areas of the environment 500 which are not seen by the set of cameras. In the blind spots 502 and 504, it may not be possible to get a clear view either of the identity of the rack at which the order picker has stopped, the identity of the item selected by the order picker from the rack and the number of items retrieved by the order picker. The side mounted cameras may be truck cam type cameras which may be permanently or magnetically fixed therein.

Referring back to FIG. 4, the order process data analysis component 408 is configured to enable the triggering component 406 to generate an electronic tag for a corresponding pallet label when the order picker spends excessive time in a blind spot during a given order picking journey. The electronic tag may include the rack identity and identity of the order items in question. The electronic tag is an internal data structure of a tracking algorithm, implemented by the order process data analysis component 408. The electronic tag may be linked with an order picker for the duration of a particular ordering process only. The spending of configurable excessive time in the blind spot may increase the likelihood of a pick job non-compliance and may form basis for a decision to trigger a quality process deviation event audit. The function used by the triggering component 406 to generate the electronic tag comprises two variables, namely a picker classification parameter (PC), established and updated from historical performance/behavior data, and a time parameter (TS) which counts the time spent by the picker in the one or more blind spots 502 and 504.

In other words, the function used by the triggering component 406 may be described as:

$$\text{Output}=f(-w_1 PC, w_2 TS)$$

where Output is the value of the output calculated from the function; and $w_1$ and $w_2$, are weighting variables applied to the picker classification parameter and the time parameter respectively. If the value of the output from the function is positive (i.e. Output>0) for the current order picker, the triggering component 406 may generate an electronic tag for the picker. The weights $w_1$ and $w_2$ are calculated by using the aggregated score from all the attributes from all the sensors.

Each picker will have a picker classification of "new" when first registered with the processing component 404. The picker classification is updated by the processing component 404 at the end of each order processed by the picker. To implement the update process, the processing component 404 maintains a risk matrix associated with every registered picker. The risk matrix stores a plurality of picker related variables including but not limited to the total number of orders processed by the picker, the number of audits scheduled by the system for the picker, the number of non-compliances noted in respect to the picker arising from previous audits, the number of tags issued to the picker, and other process specific parameters.

After each update made to the risk matrix, the picker classification may be computed based on a set of rules. For example, if (PA>0.2 and PW>0.05 and PT>0.3) then, picker performance may be referred to as underperforming wherein, PA refers to the percentage of historical orders fulfilled by the picker which had been subject to audit, PW refers to the percentage of historical orders fulfilled by the picker in which order non-compliances were detected by audit(s) performed on the said orders, and PT refers to the percentage of the total number of historical orders fulfilled by the picker for which the picker received tags as a result of detected order non-compliances.

It would be understood that each picker classification rule is specific to a given warehouse and may be tailored by the management team based on the type of orders, staff load, audit cost etc. Regardless of the specific formulation of the picker classification rule, the outcome thereof may be one of the following picker classifications {"new", "excellent", "good", "correctly-performing" and "under-performing"}.

In an example, the body cams worn by the order pickers has a field of view that give approximately 73% supervisory coverage. The truck camera has a field of view that give approximately 63% supervisory coverage. Thus, the hybrid system involving multiple body cameras, and truck cameras provide a coverage of 83%. The order process data analysis component 408 is configured to acknowledge what was not seen, i.e. the 17% blind spot. The order process data analysis component 408 may virtually "tag" at-risk items in the combined blind spot for increased audit scrutiny and eliminate the 83% that is supervised by the set of cameras. The blind spot feature can assign the audit priority by the higher risk factor and thereby reduce the overall audit burden/effort/cost. The audit priority is computed at the end of each order processing through the combination of a local blind-spot risk function and a global risk function. More specifically, audit priority may be described as f_blindspot_risk (PC, {tag})+f_global_risk($-w_3$LP, $+w_4$PSP, $-w_5$PDP, $-w_6$TC, $-w_7$Delta, $+w_8$Tz, $-w_9$T, $-w_{10}$Tobs) where the parameters of the local blind-spot risk function and a global risk function are as follows:

where tag is a Boolean function,

LP is the location of the picker with reference to risk zones in the distribution centre; PSP is a pallet status parameter which describes the state of completion of a pallet or more specifically the pick order compiled on the pallet, PDP is a pallet deviation parameter which describes the degree of deviation of the pattern of assembly of the pick order from the assembly pattern established under standard operating procedures, TC is a trip classification parameter whose value may be determined by the combination of the attributes of individual items (e.g. awkward shape to manually handle, heavy item) in the relevant pick job and the recipient store/destination of that pick job, $T_{start}$, $T_{end}$ respectively refer to the start time and end time of the relevant pick job and $$\Delta T = T_{end} - T_{start}$$

T is the deviation of ambient temperature along the pick route from normal body temperature (e.g. the pick route requires time to be spent in a refrigerated area for perishable goods; or if the pick job is being undertaken at elevated temperatures during the peak of summer)); Tobs refers to the presence of traffic or obstructions along the pick route; and Tz refers to the time zone in which the pick job is being undertaken. The weights can be manually inputted parameters or driven automatically by the AI.

Both the local blind-spot risk function and the global risk function are learned by the processing component 404 using a training pattern which may be formed by the local blind-spot risk function and the global risk function parameters as respective input vectors and a single component Boolean output vector based on a decision whether or not to issue an order non-compliance alert after the audit.

Figure 6:
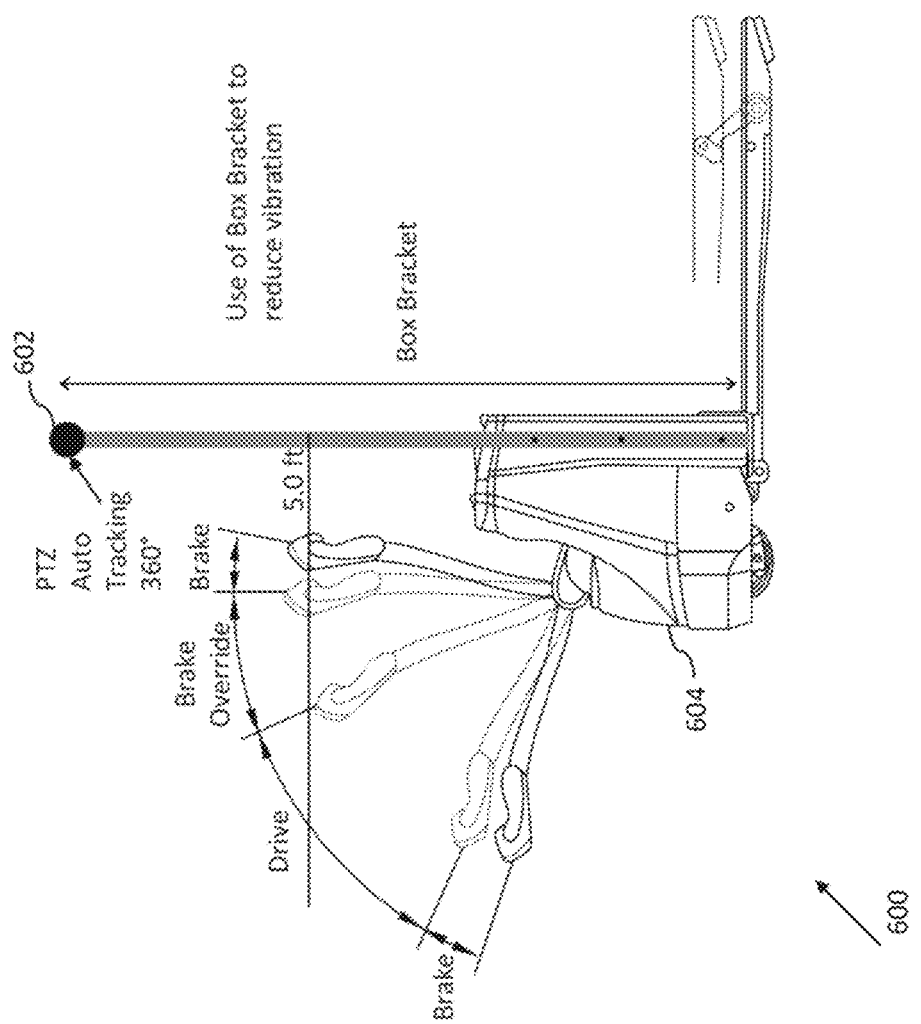
FIG. 6 illustrates an additional overhead PTZ camera for capturing blind spots, in accordance with an embodiment of the present disclosure.

FIG. 6 illustrates an additional overhead Pan, Tilt and Zoom (PTZ) camera 602 in corresponding environment 600, in accordance with an embodiment of the present disclosure. The PTZ camera 602 is an overhead 360° camera positioned on 6 to 12 ft mounting bracket, so as to see in front of and behind pallet truck 604 in the areas marked as blind spots.

Referring back to FIG. 4, the historical data analysis auditing component 404 is configured to classify a behavior of an order picker, based on their observed behavior over time. The classification serves as an indication of the confidence in the order-pickers ability to correctly complete the task within the time allowed, and further serves to provide an additional weighting to the audit tags on a given order journey.

In an example, a tagged order from an "under-performing" order picker might be weighted more heavily than a tagged order from a "correctly performing" order picker. In a further example, tags on an order from a "good" order picker might be ignored if the value of the local blind-spot risk function is small, whereas tags on an order from a "bad" order picker could be seized upon to trigger an immediate manual audit on the pallet and on the tagged items in the pallet or combined with other weights to raise the risk level of a potential non-conforming process if the local blind-spot risk function results in a high value. The combinatorial effect of the different inputs into the processing component 404 enables the processing component 404 to learn and improve the confidence and accuracy of the quality audit system over time.

The details of triggering of a quality process correcting event for a pallet are stored for corresponding unique ID, which upon pallet build completion, prevent the pallet from being further processed until a quality audit has been conducted. The quality audit in itself is a manual process where the human operator must break down the pallet to confirm each item for correctness against a bill of materials and verify that all the items are present. The AI based processor 214 may also provide a user interface that may provide prompts in the form of text, projected highlighting onto specific areas of the pallet using a projector or GIF's to support the quality auditing and speeding up the process. When the quality audit is successfully completed, the AI based processor 214 may update the status of the pallet to "released for shipping" and the pallet may continue through the next process steps for shipping.

Figure 7:
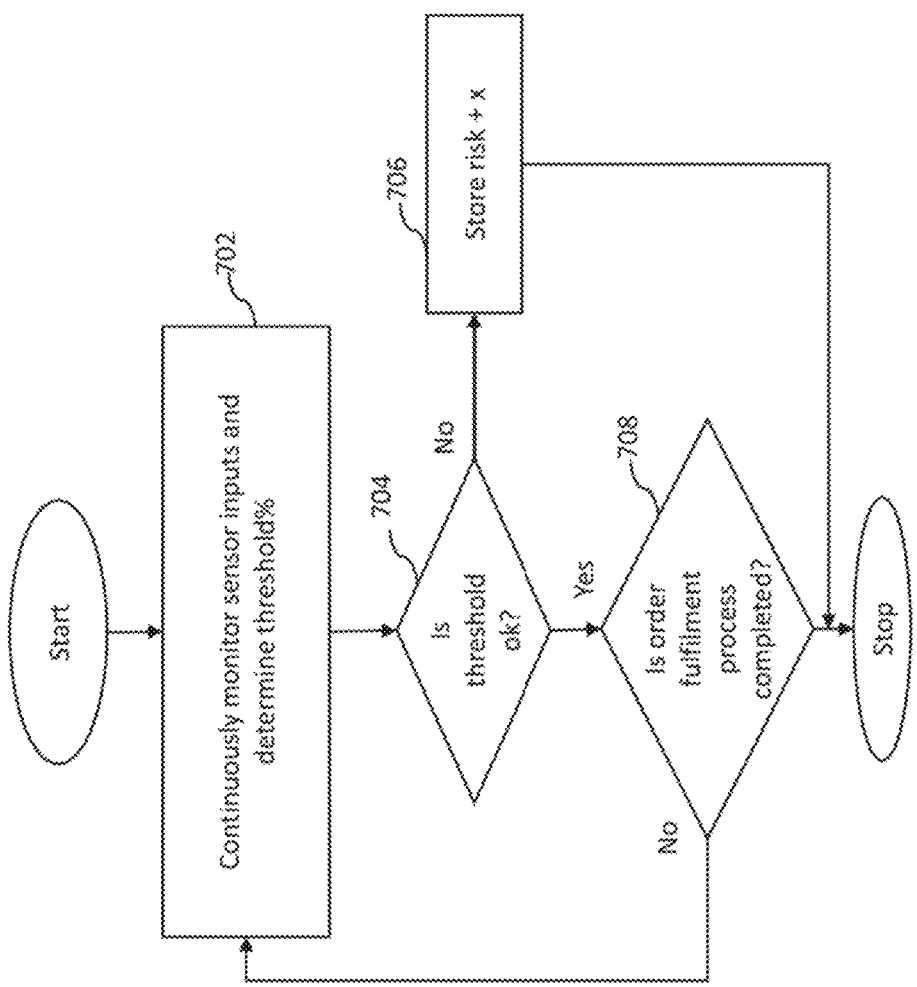
FIG. 7 is a flowchart illustrating a method of determining whether to trigger a quality audit event for the picking sub-process, in accordance with an embodiment of the present disclosure.

FIG. 7 is a flowchart illustrating a method of determining whether to trigger a quality audit event for a picking sub-process of an order fulfillment process, in accordance with an embodiment of the present disclosure.

At step 702, the inputs from the set of cameras are continuously monitored and a threshold % is determined. At step 704, it is determined whether the threshold is acceptable. In other words, step 704 involves deciding whether the combined value of the f_blindspot_risk and the f_global_risk functions exceeds a configurable threshold value. The threshold value is dependent on a variety of factors such as lighting, vibration and available field of view. The combination of these attributes inform a corresponding AI based processor which in turn designates a threshold value which is a percentage awareness of the observable environment at any given time. The range of threshold values is dynamically adjusted based on AI learning and/or closed loop feedback from previously triggered quality assessment and/or non-compliance events.

If the threshold is not acceptable, (i.e. the combined value of f_blindspot_risk and the f_global_risk functions is less than a configurable threshold value) then at step 706, the sum of the risk score and a variable x, being the number of blind spots traversed by the picker during the pick journey is stored. During the order fulfilment process, all the inputs from the set of cameras are stored and monitored for observable process deviations and also for processing blind spots. The risk score is combined to a human operator's ongoing performance risk rating at the end of the process to determine whether or not to trigger a quality audit event or flag corresponding pallet for audit or trigger a real-time intervention during the pick journey. The intervention may take the form of pausing the pick journey and issuing instructions to the picker to show a product picked in the blind spot to the environmental sensor array to prove that a required item has been picked. In the event either the picker fails to comply with the instruction or the item shown by the picker does not match the required item, an alert is sent to the supervisor who may choose an appropriate course of action (which may include triggering an immediate audit of the pick job.

The overall result is then archived to become part of that operator's overall risk score. Particular blackspots along the process in the environment may also be flagged for improved sensory coverage and to improve the risk associated with poor coverage of a particular area within a specific location in the environment. Also, the probability of whether the quality of the input from the environment was sufficient to determine if the prescribed process has been adhered to or not is determined. The probability refers to the likelihood of an error in process as having occurred. The total risk score is the summing up of all of the factors which would increase the likelihood of a mistake being made during the process.

At step 708, it is checked if the order fulfillment process is completed. If the order fulfillment process is not completed, then the method goes back to step 702.

Figure 8:
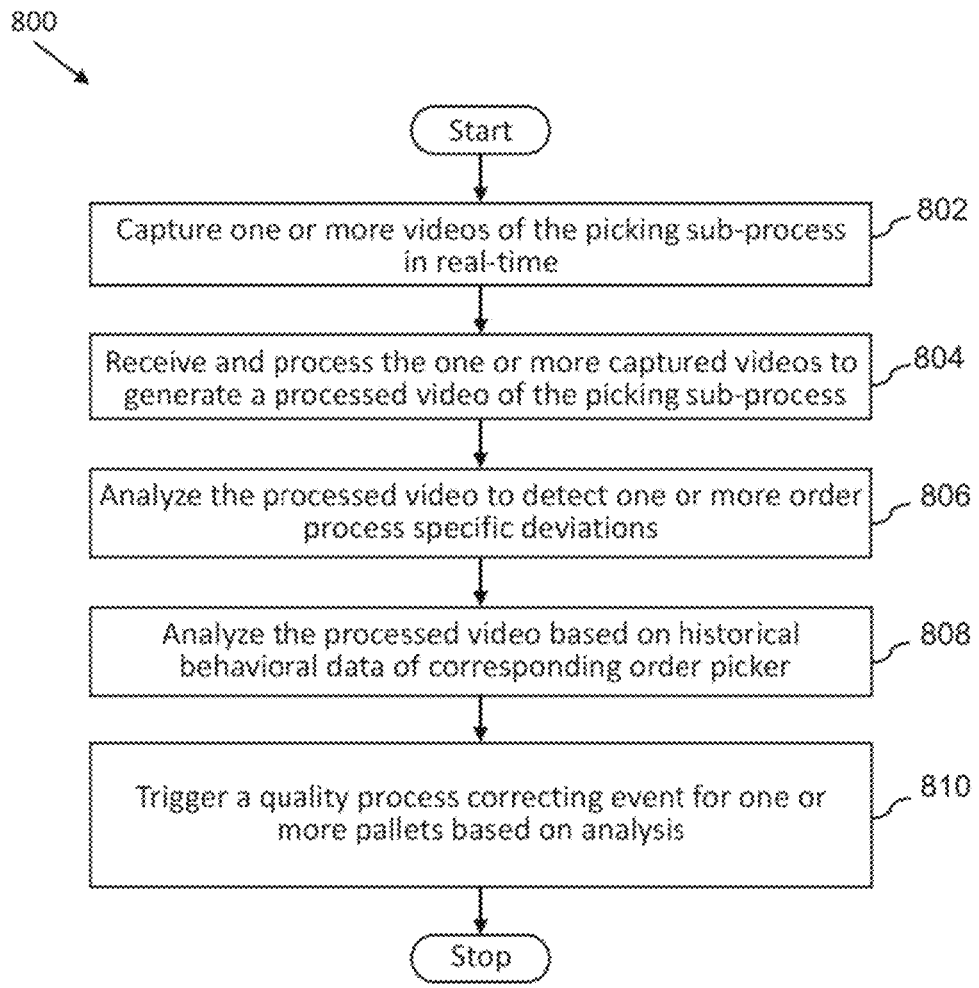
FIG. 8 is a flowchart illustrating a method of performing smart auditing of the picking sub-process, in accordance with an embodiment of the present disclosure.

FIG. 8 is a flowchart illustrating a method 800 of performing smart auditing of the picking sub-process in the environment, in accordance with an embodiment of the present disclosure.

At step 802, one or more videos of the picking sub-process are captured in real-time. In an embodiment of the present disclosure, the set of cameras includes a plurality of rack cameras configured to be positioned on one or more racks, a plurality of truck cameras configured to be positioned on a pallet truck, a body camera configured to be attached to a body of an order picker, and a mobile camera configured to be positioned on a mobile autonomous device.

At step 804, the one or more captured videos are received and processed in real-time to generate a processed video of the picking sub-process. In an embodiment of the present disclosure, each video input is weighed depending on placement and environmental conditions such as vibration and lighting etc. and combined with other video inputs to generate an interlaced scene of the environment. An interlaced scene is formed by stitching together of multiple scene views received from the set of cameras, to create a logical scene which is representative of the combination of all of the available views.

At step 806, the processed video is analyzed to detect one or more order process specific deviations. In an embodiment of the present disclosure, the analysing the processed video to detect one or more order process specific deviations includes comparing an observed behavior of an order picker with one or more instructions given to the order picker during corresponding order picking route, and adding an electronic tag to the unique ID of corresponding pallet when the observed behavior deviates from the one or more instructions, wherein the electronic tag is indicative of process non-conformation.

In another embodiment of the present disclosure, the analysing the processed video to detect one or more order process specific deviations includes comparing an observed behavior of an order picker with an expected behavior of the order picker during corresponding order picking route, and adding an electronic tag to the unique ID of corresponding pallet when the observed behavior deviates from the expected behavior, wherein the electronic tag is indicative of process non-conformation.

In yet another embodiment of the present disclosure, the analysing the processed video to detect one or more order process specific deviations includes detecting one or blind spots in the environment, and adding an electronic tag to the unique ID of corresponding pallet when a time spent by an order picker in the one or more blind spots is greater than a predefined threshold.

At step 808, the processed video is analyzed based on historical behavioural data of corresponding order picker. In an embodiment of the present disclosure, the analysing the processed video based on historical data analysis component includes classifying a behavior of an order picker, based on their observed behavior over time, assigning a risk rating to the order picker based on the classification, and adding the risk rating of the order picker to unique ID of corresponding one or more pallets.

At step 810, a quality process correcting event is triggered for one or more pallets based on analysis. In an embodiment of the present disclosure, the triggering the quality process correcting event includes computing a risk score for a pallet during the order picking route based on deviations of corresponding order picker behavior from the instructions, deviations of corresponding order picker behavior from expected behavior, time spent by corresponding order picker in the one or more blind spots, and a risk rating of the order picker, and triggering an immediate manual audit on the pallet when the risk score is greater than or equal to a predefined risk threshold.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for performing smart auditing of a picking sub-process of an order fulfilment process in a warehousing environment, wherein the warehousing environment comprises one or more racks for storing one or more boxes on one or more pallets, and wherein each pallet is assigned a unique identification (ID) in an information database, the system comprising:
   a set of cameras arranged to capture the picking sub-process in real-time; and
   an Artificial Intelligence (AI) based processor communicatively coupled to the set of cameras, and comprising:
      an input component configured to receive and process a set of video inputs from a corresponding set of cameras to generate a processed video of the picking sub-process; and
      a processing component comprising:
         an order process data analysis component configured to analyze the processed video to detect one or more order process specific deviations by comparing an observed behavior of the order picker with:
            one or more instructions given to the order picker during a corresponding order picking route; and
            an expected behavior of the order picker during the corresponding order picking route;

a historical data analysis component configured to analyze the processed video based on historical behavioural data of a corresponding order picker; and a triggering component configured to trigger a quality process correcting event for one or more pallets based on the comparison and analysis performed by the processing component.

2. The system as claimed in claim 1, wherein the order process data analysis component is configured to:
add an electronic tag to the unique ID of corresponding pallet when the observed behavior deviates from the one or more instructions, wherein the electronic tag is indicative of process non-conformation.

3. The system as claimed in claim 1, wherein the order process data analysis component is configured to:
add an electronic tag to the unique ID of corresponding pallet when the observed behavior deviates from the expected behavior, wherein the electronic tag is indicative of process non-conformation.

4. The system as claimed in claim 1, wherein the order process data analysis component is configured to:
detect one or more blind spots in the environment; and
add an electronic tag to the unique ID of corresponding pallet when a time spent by an order picker in the one or more blind spots is greater than a predefined threshold.

5. The system as claimed in claim 4 further comprising an additional overhead Pan, Tilt and Zoom (PTZ) camera configured to be positioned on pallet truck to capture the one or more blind spots.

6. The system as claimed in claim 1, wherein the historical data analysis component is configured to:
classify a behavior of an order picker, based on their observed behavior over time;
assign a risk rating to the order picker based on the classification; and
add the risk rating of the order picker to the unique ID of each pallet that has been picked up by the order picker.

7. The system as claimed in claim 1, wherein the set of cameras comprises:
a plurality of rack cameras configured to be positioned on one or more racks;
a plurality of truck cameras configured to be positioned on a pallet truck;
a body camera configured to be attached to a body of an order picker; and
a mobile camera configured to be positioned on a mobile autonomous device.

8. The system as claimed in claim 1, wherein the triggering component is configured to:
compute a risk score for a pallet during the order picking route based on deviations of corresponding order picker behavior from the instructions, deviations of corresponding order picker behavior from expected behavior, time spent by corresponding order picker in the one or more blind spots, and a risk rating of the order picker; and
trigger an immediate manual audit on the pallet when the risk score is greater than or equal to a predefined risk threshold.

9. The system as claimed in claim 1, wherein a priority order of conducting a quality process correcting event is computed at an end of each order processing function based on a combination of a local blind-spot risk function, and a global risk function, wherein the local blind-spot risk function is computed based on time spent by a corresponding order picker in the one or more blind spots, and the global risk function is computed based on a location of the order picker with reference to risk zones, a pallet status parameter indicating the state of completion of a pallet, a pallet deviation parameter indicating the degree of deviation of the pattern of assembly of a pick order from the assembly pattern established under standard operating procedures, a trip classification parameter in a relevant pick job, a recipient store/destination of a pick job, a start time and end time of the relevant pick job, a deviation of ambient temperature along the pick route from normal body temperature, the presence of traffic or obstructions along a pick route, and a time zone in which the pick job is being undertaken.

10. A method for performing smart auditing of a picking sub-process of an order fulfilment process in a warehousing environment, wherein the warehousing environment comprises one or more racks for storing one or more boxes on one or more pallets, and wherein each pallet is assigned a unique identification (ID) in an information database, the method comprising:
capturing one or more videos of the picking sub-process in real-time;
receiving and processing the one or more captured videos to generate a processed video of the picking sub-process;
analyzing the processed video to detect one or more order process specific deviations by comparing an observed behavior of an order picker with:
one or more instructions given to the order picker during a corresponding order picking route; and
an expected behavior of the order picker during the corresponding order picking route;
analyzing the processed video based on historical behavioural data of a corresponding order picker; and
triggering a quality process correcting event for one or more pallets based on the comparison and analysis.

11. The method as claimed in claim 10, wherein the analysing of the processed video to detect one or more order process specific deviations comprises:
adding an electronic tag, indicative of process non-conformation, to the unique ID of corresponding pallet when the observed behavior deviates from the one or more instructions.

12. The method as claimed in claim 10, wherein the analysing of the processed video to detect one or more order process specific deviations comprises:
adding an electronic tag, indicative of process non-conformation, to the unique ID of corresponding pallet when the observed behavior deviates from the expected behavior.

13. The method as claimed in claim 10, wherein the analysing the processed video to detect one or more order process specific deviations comprises
detecting one or more blind spots in the environment; and
adding an electronic tag to the unique ID of corresponding pallet when a time spent by an order picker in the one or more blind spots is greater than a predefined threshold.

14. The method as claimed in claim 10, wherein the analysing the processed video based on historical data analysis component comprises:
classifying a behavior of an order picker, based on their observed behavior over time;
assigning a risk rating to the order picker based on the classification; and
adding the risk rating of the order picker to unique ID of each pallet that has been picked up by the order picker.

15. The method as claimed in claim 10, wherein the triggering the quality process correcting event comprises:
computing a risk score for a pallet during the order picking route based on deviations of corresponding order picker behavior from the instructions, deviations of corresponding order picker behavior from expected behavior, time spent by corresponding order picker in the one or more blind spots, and a risk rating of the order picker; and
triggering an immediate manual audit on the pallet when the risk score is greater than or equal to a predefined risk threshold.

16. The method as claimed in claim 10, wherein a priority order of conducting a quality process correcting event is computed at an end of each order processing function based on a combination of a local blind-spot risk function, and a global risk function, wherein the local blind-spot risk function is computed based on time spent by corresponding order picker in the one or more blind spots, and the global risk function is computed based on a location of the order picker with reference to risk zones, a pallet status parameter indicating the state of completion of a pallet, a pallet deviation parameter indicating the degree of deviation of the pattern of assembly of a pick order from the assembly pattern established under standard operating procedures, a trip classification parameter in a relevant pick job, a recipient store/destination of a pick job, a start time and end time of the relevant pick job, a deviation of ambient temperature along a pick route from normal body temperature, the presence of traffic or obstructions along the pick route, and a time zone in which the pick job is being undertaken.

17. A non-transitory computer readable medium for performing smart auditing of a picking sub-process of an order fulfilment process in a warehousing environment, wherein the warehousing environment comprises one or more racks for storing one or more boxes on one or more pallets, and wherein each pallet is assigned a unique identification (ID) in an information database, the non-transitory computer readable medium comprising a set of instructions, the set of instructions when executed by a processor of a computer causes the processor to:
capture one or more videos of the picking sub-process in real-time;
receive and process the captured one or more videos to generate a processed video of the picking sub-process;
analyze the processed video to detect one or more order process specific deviations by comparing an observed behavior of an order picker with:
one or more instructions given to the order picker during a corresponding order picking route; and
an expected behavior of the order picker during the corresponding order picking route;
analyze the processed video based on historical behavioural data of a corresponding order picker; and
trigger a quality process correcting event for one or more pallets based on the comparison and analysis.

18. The non-transitory computer readable medium as claimed in claim 17, wherein the analysing of the processed video to detect one or more order process specific deviations comprises:
adding an electronic tag, indicative of process non-conformation, to the unique ID of corresponding pallet when the observed behavior deviates from the one or more instructions.

19. The non-transitory computer readable medium as claimed in claim 17, wherein the analysing of the processed video to detect one or more order process specific deviations comprises:
adding an electronic tag, indicative of process non-conformation, to the unique ID of corresponding pallet when the observed behavior deviates from the expected behavior.

20. The non-transitory computer readable medium as claimed in claim 17, wherein the analysing of the processed video to detect one or more order process specific deviations comprises:
detecting one or more blind spots in the warehousing environment; and
adding an electronic tag to the unique ID of corresponding pallet when a time spent by an order picker in the one or more blind spots is greater than a predefined threshold.

21. The non-transitory computer readable medium as claimed in claim 17, wherein the triggering of the quality process correcting event comprises:
computing a risk score for a pallet during the order picking route based on deviations of corresponding order picker behavior from the instructions, deviations of corresponding order picker behavior from expected behavior, time spent by corresponding order picker in the one or more blind spots, and a risk rating of the order picker; and
triggering an immediate manual audit on the pallet when the risk score is greater than or equal to a predefined risk threshold.

* * * * *